United States Patent
Yu et al.

(10) Patent No.: US 11,879,505 B2
(45) Date of Patent: Jan. 23, 2024

(54) ELECTROMAGNETIC CLUTCH

(71) Applicant: Jing-Jin Electric Technologies Co., Ltd., Beijing (CN)

(72) Inventors: Ping Yu, Beijing (CN); Changqi Yang, Beijing (CN); Jianwen Li, Beijing (CN); Yang Cao, Beijing (CN)

(73) Assignee: Jing-Jin Electric Technologies Co., Ltd, Beijing (CN)

( * ) Notice: Subject to any disclaimer, the term of this patent is extended or adjusted under 35 U.S.C. 154(b) by 0 days.

(21) Appl. No.: 18/245,376

(22) PCT Filed: Dec. 30, 2020

(86) PCT No.: PCT/CN2020/141460
§ 371 (c)(1),
(2) Date: Mar. 15, 2023

(87) PCT Pub. No.: WO2022/057158
PCT Pub. Date: Mar. 24, 2022

(65) Prior Publication Data
US 2023/0358282 A1    Nov. 9, 2023

(30) Foreign Application Priority Data

Sep. 18, 2020   (CN) ............................ 20201098927.4

(51) Int. Cl.
*F16D 27/09* (2006.01)
*F16D 27/01* (2006.01)
*F16D 27/14* (2006.01)

(52) U.S. Cl.
CPC ............. *F16D 27/14* (2013.01); *F16D 27/01* (2013.01); *F16D 27/09* (2013.01)

(58) Field of Classification Search
CPC ...... F16D 27/01; F16D 27/108; F16D 27/118; F16D 27/09; F16D 27/14
See application file for complete search history.

(56) References Cited

U.S. PATENT DOCUMENTS 2,724,474 A * 11/1955 Hupp ...................... F16D 27/09
                                                                   192/84.95
2009/0127059 A1    5/2009 Knoblauch
(Continued)

FOREIGN PATENT DOCUMENTS

CN        201858071 U      6/2011
CN        103758889 A      4/2014
(Continued)

OTHER PUBLICATIONS

PCT International Search Report dated Jun. 11, 2021, issued in PCT Application No. PCT/CN2020/141460.
(Continued)

*Primary Examiner* — David R Morris
*Assistant Examiner* — Lillian T Nguyen
(74) *Attorney, Agent, or Firm* — ArentFox Schiff LLP

(57) ABSTRACT

An electromagnetic clutch is provide that includes a fixed component, a driven component and an elastic component. The fixed component includes a magnetic yoke provided thereon with multiple iron cores, and each iron core is provided thereon with a coil. The driven component includes an armature disc provided thereon with multiple magnets. The armature disc and the magnetic yoke are disposed correspondingly, and the iron cores and the magnets are disposed correspondingly. The elastic component is used to keep the armature disc at a disengaged position from magnetic yoke. When the coil is energized in a forward direction, the iron core attracts the magnet and when the coil is energized in a reverse direction, the iron core generates an electromagnetic force to reduce an attractive force of the magnet.

16 Claims, 2 Drawing Sheets

(56) References Cited

U.S. PATENT DOCUMENTS

| | | | |
|---|---|---|---|
| 2018/0149210 A1 | | 5/2018 | Yu et al. |
| 2021/0010543 A1 | | 1/2021 | Pei et al. |
| 2023/0145255 A1 * | | 5/2023 | Cao ..................... F16D 27/108 192/84.9 |

FOREIGN PATENT DOCUMENTS

| | | | | | |
|---|---|---|---|---|---|
| CN | 105864315 | A | | 8/2016 | |
| CN | 108443353 | A | | 8/2018 | |
| CN | 210034218 | U | | 2/2020 | |
| CN | 112145576 | A | | 12/2020 | |
| CN | 213899666 | U | * | 8/2021 | ........... F16D 27/004 |
| CN | 114110037 | A | * | 3/2022 | ........... F16D 27/112 |
| EP | 0475504 | A2 | | 3/1992 | |
| EP | 3112715 | A1 | | 1/2017 | |
| EP | 3748185 | A1 | * | 12/2020 | ............ B60R 22/34 |
| JP | 2006342937 | A | | 12/2006 | |
| JP | 2018096382 | A | | 6/2018 | |
| WO | 2020164866 | A1 | | 8/2020 | |

OTHER PUBLICATIONS

European Search Report in EP20954011, dated Nov. 29, 2023, 4 pages.

* cited by examiner

ELECTROMAGNETIC CLUTCH

CROSS-REFERENCE TO RELATED APPLICATIONS

This application is a National Phase of PCT/CN2020/141460, filed on Dec. 30, 2020, which claims priority to Chinese Patent Application No. 202010989272.4, filed on Sep. 18, 2020, the disclosures of each of which are hereby incorporated by reference in their entireties.

TECHNICAL FIELD

The present disclosure belongs to the technical field of clutch, and particularly relates to an electromagnetic clutch.

BACKGROUND

With the continuous development of the automobile industry, the electromagnetic clutch is more widely used in new energy vehicles, and users have more and urgent demands for the balance of energy consumption, heat generation and service life of the electromagnetic clutch. However, traditional electromagnetic clutches have many shortcomings and problems, such as high energy consumption, high heat generation, electromagnetic force being liable to current fluctuation, etc., which affect the performance and service life of the electromagnetic clutch to a certain extent.

SUMMARY

In view of the above problems, the present disclosure provides an electromagnetic clutch to overcome the above problems or at least partially solve the above problems.

In order to achieve the above object, the present disclosure adopts the following technical solutions:

The present disclosure provides an electromagnetic clutch, comprising: a fixed component, a driven component and an elastic component, wherein the fixed component comprises a magnetic yoke, the magnetic yoke is provided thereon with multiple iron cores, each iron core is provided thereon with a coil, the driven component comprises an armature disc, and the armature disc is provided thereon with multiple magnets;

the armature disc and the magnetic yoke are disposed correspondingly, and the iron cores and the magnets are disposed correspondingly;
the elastic component is used to keep the armature disc at a disengaged position from magnetic yoke;
when the coil is energized in a forward direction, the iron core attracts the magnet, and the armature disc overcomes an elastic force of the elastic component and moves to an engaged position with the magnetic yoke, so that the fixed component and the driven component are connected for transmission;
when the coil is energized in a reverse direction, the iron core generates an electromagnetic force to reduce an attractive force of the magnet, the elastic force of the elastic component overcomes the attractive force of the magnet, and repels the armature disc to a disengaged position from the magnetic yoke.

Further, the iron cores and the magnets are presented individually or in combination.

Further, the multiple iron cores are uniformly distributed in the magnetic yoke, a quantity of the iron cores is the same as a quantity of the magnets, positions of the iron cores correspond to positions of the magnets one by one, and the corresponding iron core and magnet are located on a same axis.

Further, the magnets have a low temperature coefficient, and are used to avoid demagnetization and increase the impact resistance of the electromagnetic clutch, so that the electromagnetic clutch can work normally under different working conditions and temperatures.

Further, a top surface of the magnets is rectangular, square, triangular or circular; and
the armature disc is provided with a magnet groove, and the magnets are fixed in the magnet groove by means of glue pouring or injection molding.

Further, the coils are connected in parallel, in series or by grouping in series-parallel.

Further, the magnetic yoke is provided with a damping pad, which is used for positioning to maintain a gap between the armature disc and the magnetic yoke, and is also used for damping and noise reduction.

Further, the driven component is slidably sleeved on a first shaft, and the fixed component is fixed on a second shaft; and
a top end of the first shaft is fixed with a shaft pressing plate, and the elastic component is provided between the driven component and the shaft pressing plate.

Further, the driven component also comprises a movable gear sleeve, the fixed component comprises a fixed gear sleeve, and the movable gear sleeve and the fixed gear sleeve can be engaged for transmission;
the magnetic yoke is fixedly sleeved outside the fixed gear sleeve, the armature disc is rotatably sleeved outside the movable gear sleeve, and the movable gear sleeve is movable axially along with the armature disc.

Further, the magnetic yoke and the fixed gear sleeve are in clearance fit, so that the magnetic yoke and the fixed gear sleeve are rotatable relative to each other, and the fixed gear sleeve and the movable gear sleeve rotate together at an engaged position while the magnetic yoke and the armature disc remain fixed.

When the coil is energized in a reverse direction, the iron core generates electromagnetic force to reduce the magnet's attractive force, the elastic force of the elastic component overcomes the magnet's attractive force, and pushes the armature disc to a disengaged position from the magnetic yoke.

The advantages and beneficial effects of the present disclosure are as follows.

The electromagnetic clutch of the present disclosure does not need to be energized in the disengaged state and the engaged state, and has the advantages of low energy consumption, low heat generation and long service life.

Figure 1:
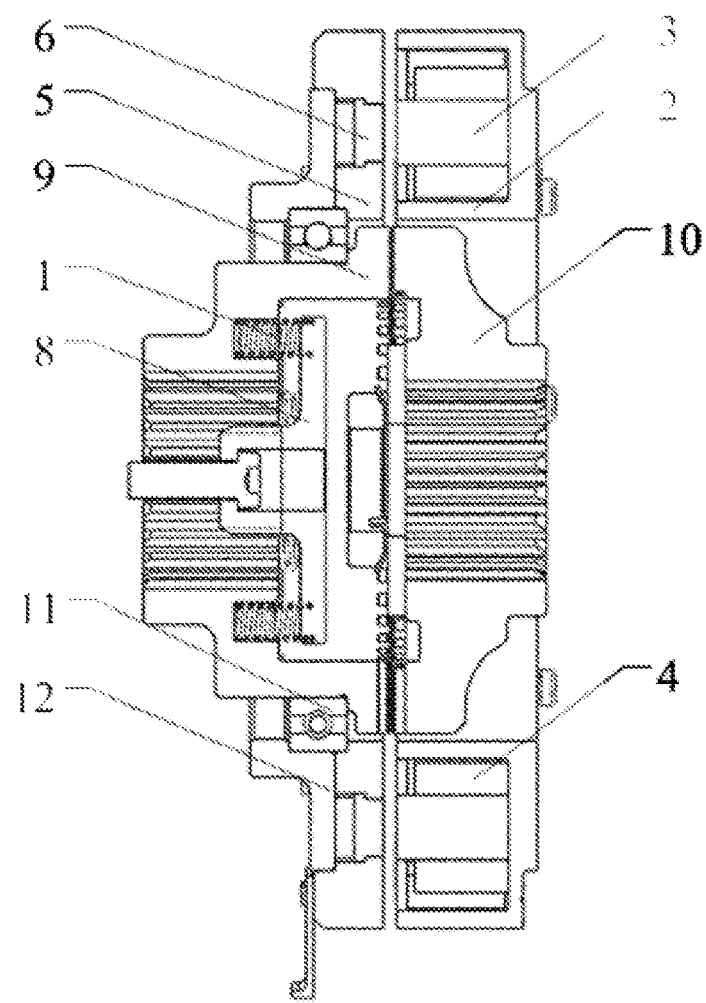
FIG. 1 is an axial sectional view of an electromagnetic clutch in an embodiment of the present disclosure.

In the drawings: 1. elastic component, 2. magnetic yoke, 3. iron core, 4. coil, 5. armature disc, 6. magnet, 7. damping pad, 8. shaft pressing plate, 9. movable gear sleeve, 10. fixed gear sleeve, 11. bearing, 12. bearing seat.

DETAILED DESCRIPTION

In order to make the objectives, technical solutions, and advantages of the present disclosure clearer, the technical solutions of the present disclosure will be described clearly and completely in conjunction with specific embodiments of the present disclosure and corresponding drawings. Obviously, the described embodiments are only part of the embodiments of the present disclosure, rather than all of the embodiments. Based on the embodiments in the present disclosure, all other embodiments obtained by those of ordinary skill in the art without paying creative work shall fall within the protection scope of the present disclosure.

The technical solutions provided by the embodiments of the present disclosure are described in detail below in conjunction with the accompanying drawings.

Figure 3:
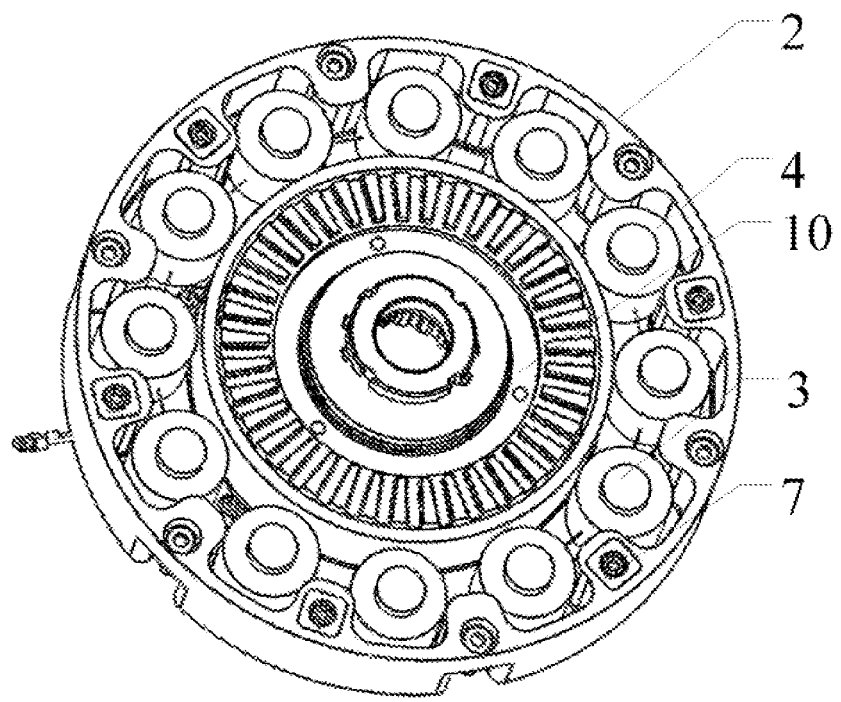
FIG. 3 is a schematic view of the structure of a fixed component in an embodiment of the present disclosure.

An embodiment of the present disclosure provides an electromagnetic clutch. As shown in FIGS. 1 and 3, the electromagnetic clutch comprises a fixed component, a driven component and an elastic component 1. The fixed component maintains a fixed position in the axial direction of the electromagnetic clutch, and the driven component is movable at least in the axial direction of the electromagnetic clutch, so that the electromagnetic clutch can be at an engaged position or a disengaged position.

The fixed component comprises a magnetic yoke 2, which can form a housing of the fixed component of the electromagnetic clutch. The magnetic yoke 2 is provided thereon with multiple iron cores 3, and each iron core 3 is provided thereon with a coil 4. The coil 4 can generate a magnetic force when energized. The driven component comprises an armature disc 5, and the armature disc 5 is provided thereon with multiple magnets 6. The quantities of iron cores 3 and magnets 6 may be set as required.

In this embodiment, the multiple iron cores 3 are provided independently, so that the magnetic induction lines are concentrated and densified relative to the magnet 6, and the electric energy conversion rate is higher. According to the principle that like poles repel and unlike poles attract each other, the electromagnetic force of the coil 4 will have a great difference when the coil 4 is energized in a forward direction and in a reverse direction, thus realizing the separation of the armature disc 5 and the magnetic yoke 2.

The armature disc 5 and the magnetic yoke 2 are disposed correspondingly, their axes are in the same straight line, and the iron core 3 and the magnet 6 are disposed correspondingly so as to facilitate the engagement between the iron core 3 and the magnet 6.

The elastic component 1 is provided in the driven component. In the general state, the elastic component 1 is compressed or stretched, and a preload force is provided on the elastic component 1 to make the armature disc be located at a certain position, so as to keep the armature disc 5 at a disengaged position from the magnetic yoke 2.

When the coil 4 is energized in a forward direction, the iron core 3 attracts the magnet 6, and the armature disc 5 overcomes the elastic force of the elastic component 1 and moves to an engaged position with the magnetic yoke 2, so that the fixed component and the driven component are connected for transmission.

When the coil 4 is energized in a reverse direction, the iron core 3 generates an electromagnetic force to reduce an attractive force of the magnet 6, the elastic force of the elastic component 1 overcomes the attractive force of the magnet 6, and repels the armature disc 5 to a disengaged position from the magnetic yoke 2.

The working principle of the electromagnetic clutch in the present disclosure is as follows. When at the disengaged position, the iron cores 3 do not generate an electromagnetic force, and the compression force or tensile force of the elastic component 1 is greater than the attractive force of the magnets 6, so a normal gap is maintained between the armature disc 5 and the magnetic yoke 2. When the clutch receives a command for engagement, the coils 4 are energized in a forward direction. The resultant force generated by the combined action of the electromagnetic force generated by the iron cores 3 and the magnetic force of the magnets 6 is greater than the compression force or tensile force of the elastic component 1. The armature disc 5 is engaged with the magnetic yoke 2, and thus the fixed component and the driven component are connected for transmission. After engaged, the coils 4 may be powered off. The coils 4 do not generate an electromagnetic force, and the magnetic force generated by the magnets 6 is still greater than the compression force or tensile force of the elastic component 1, so that the armature disc 5 and the magnetic yoke 2 remain in the engaged state and perform transmission. In this state, no electric energy is consumed. When the clutch receives a command for disengagement, the coils 4 are energized in a reverse direction in the engaged state to reduce the attractive force generated by the magnets 6. When the attractive force is less than the compression force or tensile force of the elastic component 1, the armature disc 5 is disengaged from the magnetic yoke 2. The electromagnetic clutch does not need to be energized in the disengaged state and the engaged state, and has the advantages of low energy consumption, low heat generation and long service life.

In an embodiment, the iron cores 3 and the magnets 6 are presented individually or in combination. The iron cores 3 and the magnets 6 are uniformly or symmetrically distributed in an individual form. Of course, the iron cores 3 and the magnets 6 may also be uniformly or symmetrically distributed in a combined form, such as two in a group, or three in a group to form a triangle, and so on.

In an embodiment, as shown in FIG. 3, the multiple iron cores 3 are uniformly distributed in the magnetic yoke 2. The quantity of the iron cores 3 is the same as the quantity of the magnets 6. The positions of the iron cores correspond to the positions of the magnets one by one, and the corresponding iron core 3 and magnet 6 are located on the same axis so as to facilitate the engagement between the iron cores 3 and the magnets 6.

In a preferred embodiment, the magnets 6 are magnets having a low temperature coefficient, such as samarium cobalt magnet. By using the magnets having a low temperature coefficient, the demagnetization of the magnets 6 at high temperature can be prevented, thereby avoiding the gear loss phenomenon that may occur when the electromagnetic clutch is at a high temperature and the gear failure phenomenon that may occur at a low temperature. By using the magnets having a low temperature coefficient, the impact resistance of the electromagnetic clutch can also be increased. The magnetic property of the magnets having a low temperature coefficient changes very little at different temperatures, and thus the electromagnetic clutch can work normally under different working conditions and temperatures.

In an embodiment, the top surface of the magnets 6 is rectangular, square, triangular or circular. Of course, it may also be other shapes. The magnet 6 may form a T-shape as a whole. The top surface has a large area and is flush with the surface of the magnetic yoke 2.

As shown in FIG. 1, the outer circumference of the armature disc 5 is provided with a magnet groove, and the magnets 6 are fixed in the magnet groove by means of glue filling or injection molding. Of course, it may also be fixed by other methods. Preferably, one end of the magnet 6 in the magnet groove is provided with a flange, and the provision of the flange facilitates fixing the magnet 6 in the magnet groove firmly.

In an embodiment, the coils 4 are connected in the following way: parallel, series or grouping in series-parallel. The coils 4 may be connected in series, may be connected in parallel, or may be connected in series-parallel, for example, multiple coils 4 may be selected to form a group by connecting in series, and then several groups of coils 4 that have been connected in series may be connected in parallel.

In an embodiment, as shown in FIG. 3, the outer circumference of the magnet yoke 2 is provided with a damping pad 7. There may be multiple damping pads 7 that are arranged evenly and/or symmetrically. The damping pad 7 is used for positioning to maintain a gap between the armature disc 5 and the magnet yoke 2. The damping pad 7 is also used for shock absorption and noise reduction. On the one hand, the damping pad 7 can avoid the direct impact of the armature disc 5 and the magnetic yoke 2. On the other hand, when the fixed component and the driven component are connected for transmission, a certain gap is guaranteed between the armature disc 5 and the magnetic yoke 2 to reduce the vibration generated during transmission.

In an embodiment, the driven component is slidably sleeved on a first shaft, and the driven component can move along the axis direction of the first shaft. Preferably, the driven component is connected with the first shaft through splines, and is fixed circumferentially while slidable axially. The fixed component is fixed on a second shaft, and the fixed component and the second shaft are relatively fixed in both axial and circumferential directions, that is, there is no relative sliding or relative rotation between them.

As shown in FIG. 1, the top end of the first shaft is fixed with a shaft pressing plate 8, one side of the shaft pressing plate 8 is provided with a convex part along the axis direction, the outer circumferential surface of the convex part is provided with a thread, and the axis center position at the end of the first shaft is provided with a thread groove. The fixed connection between the shaft pressing plate 8 and the first shaft is realized by the thread and the thread groove. The center position of the convex part is also provided with an axial screw hole, and the fixed connection between the shaft pressing plate 8 and the first shaft is further realized by the screw hole and a screw pin or a screw bolt. The elastic component 1 is arranged between the driven part and the shaft pressing plate 8. The role of the shaft pressing plate 8 is to keep the elastic component 1 in a compressed state. The compression amount of the elastic force of the elastic component 1 will change along with the disengagement and engagement of the clutch, and the elastic force value will also change. The elastic component 1 is preferably a spring.

Figure 2:
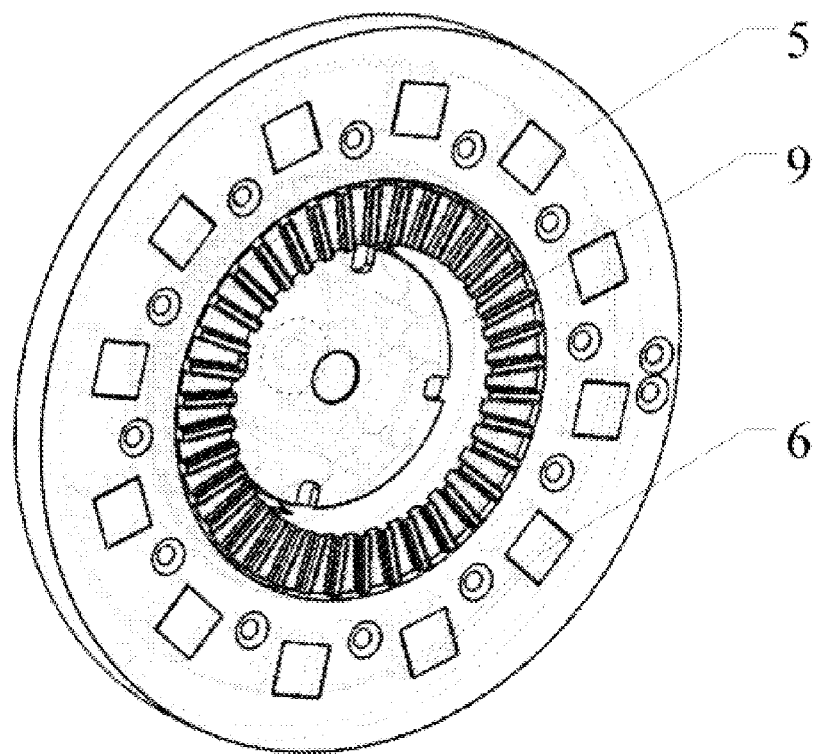
FIG. 2 is a schematic view of the structure of a driven component in an embodiment of the present disclosure.

In an embodiment, as shown in FIGS. 2-3, the driven component also comprises a movable gear sleeve 9, the fixed component comprises a fixed gear sleeve 10, and the end faces of the movable gear sleeve 9 and the fixed gear sleeve 10 are provided with end face teeth, so that the movable gear sleeve 9 and the fixed gear sleeve 10 can be engaged for transmission. The movable gear sleeve 9 and the fixed gear sleeve 10 are respectively provided therein with splines, by which the connection between the movable gear sleeve 9 and the first shaft and the connection between the fixed gear sleeve 10 and the second shaft are realized.

The fixed sleeve of the magnetic yoke 2 is fixedly sleeved outside the fixed gear sleeve 10, the armature disc 5 is rotatably sleeved outside the movable gear sleeve 9, a bearing 11 is fixedly sleeved outside the outer circumference of the movable gear sleeve 9, the bearing 11 is embedded in the bearing seat 12, the bearing seat 12 is fixedly connected with the armature disc 5, thereby realizing the relative rotation between the armature disc 5 and the movable gear sleeve 9. The movable gear sleeve 9 can move axially along with the armature disc 5. The bearing seat 12 extends to the magnet groove to prevent the magnet 6 from flying away.

In an embodiment, the magnetic yoke 2 and the fixed gear sleeve 10 are in clearance fit, so that the magnetic yoke 2 and the fixed gear sleeve 10 are rotatable relative to each other, and the fixed gear sleeve 10 and the movable gear sleeve 9 rotate together at the engaged position while the magnetic yoke 2 and the armature disc 5 remain fixed. When the driven component and the fixed component are connected for transmission, the movable gear sleeve 9 and the fixed gear sleeve 10 are engaged and rotated, the magnetic yoke 2 and the armature disc 5 will not rotate, thereby reducing power loss and improving transmission efficiency.

In sum, the present disclosure discloses an electromagnetic clutch. The electromagnetic clutch comprises a fixed component, a driven component and an elastic component. The fixed component comprises a magnetic yoke, the magnetic yoke is provided thereon with multiple iron cores, and each iron core is provided thereon with a coil. The driven component comprises an armature disc, and the armature disc is provided thereon with multiple magnets. The armature disc and the magnetic yoke are disposed correspondingly, and the iron cores and the magnets are disposed correspondingly. The elastic component is used to keep the armature disc at a disengaged position from magnetic yoke. When the coil is energized in a forward direction, the iron core attracts the magnet, and the armature disc overcomes an elastic force of the elastic component and moves to an engaged position with the magnetic yoke, so that the fixed component and the driven component are connected for transmission. When the coil is energized in a reverse direction, the iron core generates an electromagnetic force to reduce an attractive force of the magnet, the elastic force of the elastic component overcomes the attractive force of the magnet, and repels the armature disc to a disengaged position from the magnetic yoke. The electromagnetic clutch of the present disclosure does not need to be energized in the disengaged state and the engaged state, and has the advantages of low energy consumption, low heat generation and long service life.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

What is claimed is:

1. An electromagnetic clutch, comprising:
   a fixed component that includes a magnetic yoke that is provided thereon with multiple iron cores that each are provided thereon with a coil;
   a driven component that includes an armature disc that is provided thereon with multiple magnets; and
   an elastic component that is configured to keep the armature disc at a disengaged position from magnetic yoke,
   wherein the armature disc and the magnetic yoke are disposed correspondingly, and the iron cores and the magnets are disposed correspondingly;

wherein, when the coil is energized in a forward direction, the iron core is configured to attract the magnet, and the armature disc overcomes an elastic force of the elastic component and moves to an engaged position with the magnetic yoke, so that the fixed component and the driven component are connected for transmission; and wherein, when the coil is energized in a reverse direction, the iron core is configured to generate an electromagnetic force to reduce an attractive force of the magnet, the elastic force of the elastic component overcomes the attractive force of the magnet, and repels the armature disc to a disengaged position from the magnetic yoke.

2. The electromagnetic clutch according to claim 1, wherein the iron cores and the magnets are presented individually or in combination.

3. The electromagnetic clutch according to claim 2, wherein the driven component is slidably sleeved on a first shaft, and the fixed component is fixed on a second shaft; and
a top end of the first shaft is fixed with a shaft pressing plate, and the elastic component is provided between the driven component and the shaft pressing plate.

4. The electromagnetic clutch according to claim 1, wherein the multiple iron cores are uniformly distributed in the magnetic yoke, a quantity of the iron cores is the same as a quantity of the magnets, positions of the iron cores correspond to positions of the magnets one by one, and the corresponding iron core and magnet are located on a same axis.

5. The electromagnetic clutch according to claim 4, wherein:
the driven component is slidably sleeved on a first shaft, and the fixed component is fixed on a second shaft; and
a top end of the first shaft is fixed with a shaft pressing plate, and the elastic component is provided between the driven component and the shaft pressing plate.

6. The electromagnetic clutch according to claim 1, wherein the magnets have a low temperature coefficient and are used to avoid demagnetization and increase impact resistance of the electromagnetic clutch, so that the electromagnetic clutch is configured to work normally under different working conditions and temperatures.

7. The electromagnetic clutch according to claim 6, wherein:
the driven component is slidably sleeved on a first shaft, and the fixed component is fixed on a second shaft; and
a top end of the first shaft is fixed with a shaft pressing plate, and the elastic component is provided between the driven component and the shaft pressing plate.

8. The electromagnetic clutch according to claim 1, wherein a top surface of the magnets is rectangular, square, triangular or circular; and the armature disc is provided with a magnet groove, and the magnets are fixed in the magnet groove.

9. The electromagnetic clutch according to claim 8, wherein:
the driven component is slidably sleeved on a first shaft, and the fixed component is fixed on a second shaft; and
a top end of the first shaft is fixed with a shaft pressing plate, and the elastic component is provided between the driven component and the shaft pressing plate.

10. The electromagnetic clutch according to claim 1, wherein the coils are connected in parallel, in series or by grouping in series-parallel.

11. The electromagnetic clutch according to claim 10, wherein:
the driven component is slidably sleeved on a first shaft, and the fixed component is fixed on a second shaft; and
a top end of the first shaft is fixed with a shaft pressing plate, and the elastic component is provided between the driven component and the shaft pressing plate.

12. The electromagnetic clutch according to claim 1, wherein the magnetic yoke is provided with a damping pad configured for positioning to maintain a gap between the armature disc and the magnetic yoke, and also configured for damping and noise reduction.

13. The electromagnetic clutch according to claim 12, wherein:
the driven component is slidably sleeved on a first shaft, and the fixed component is fixed on a second shaft; and
a top end of the first shaft is fixed with a shaft pressing plate, and the elastic component is provided between the driven component and the shaft pressing plate.

14. The electromagnetic clutch according to claim 1, wherein the driven component is slidably sleeved on a first shaft, and the fixed component is fixed on a second shaft; and
wherein a top end of the first shaft is fixed with a shaft pressing plate, and the elastic component is provided between the driven component and the shaft pressing plate.

15. The electromagnetic clutch according to claim 14, wherein the driven component also comprises a movable gear sleeve, the fixed component comprises a fixed gear sleeve, and the movable gear sleeve and the fixed gear sleeve can be engaged for transmission; and
the magnetic yoke is fixedly sleeved outside the fixed gear sleeve, the armature disc is rotatably sleeved outside the movable gear sleeve, and the movable gear sleeve is movable axially along with the armature disc.

16. The electromagnetic clutch according to claim 15, wherein the magnetic yoke and the fixed gear sleeve are in clearance fit, so that the magnetic yoke and the fixed gear sleeve are rotatable relative to each other, and the fixed gear sleeve and the movable gear sleeve rotate together at an engaged position while the magnetic yoke and the armature disc remain fixed.

\* \* \* \* \*

UNITED STATES PATENT AND TRADEMARK OFFICE
CERTIFICATE OF CORRECTION

PATENT NO. : 11,879,505 B2
APPLICATION NO. : 18/245376
DATED : January 23, 2024
INVENTOR(S) : Ping Yu et al.

It is certified that error appears in the above-identified patent and that said Letters Patent is hereby corrected as shown below:

On the Title Page

The Foreign Application Priority Data reads:
(30) 20201098927.4
Should read:
-- (30) 202010989272.4 --

Signed and Sealed this
Thirtieth Day of April, 2024

Katherine Kelly Vidal
*Director of the United States Patent and Trademark Office*